United States Patent [19]

Westrom

[11] 4,240,124

[45] Dec. 16, 1980

[54] SURGE ARRESTER HAVING COAXIAL SHUNT GAP

[75] Inventor: Arthur C. Westrom, Stone Mountain, Ga.

[73] Assignee: Kearney-National Inc., Atlanta, Ga.

[21] Appl. No.: 44,559

[22] Filed: Jun. 1, 1979

[51] Int. Cl.[3] ........................ H02H 3/22; H02H 9/04

[52] U.S. Cl. .................................... 361/127; 361/131; 361/117; 315/36; 313/325

[58] Field of Search ............... 361/127, 126, 128, 117, 361/131, 58, 54, 56; 315/35, 36; 313/231.2, 231.1, 325

[56] References Cited

U.S. PATENT DOCUMENTS

| | | | |
|---|---|---|---|
| 2,473,850 | 6/1949 | Beck et al. | 361/127 |
| 3,519,878 | 7/1970 | McStrack et al. | 361/128 X |
| 4,161,012 | 7/1979 | Cunningham | 361/128 |
| 4,174,530 | 11/1979 | Kresge et al. | 361/127 |

FOREIGN PATENT DOCUMENTS

| | | | |
|---|---|---|---|
| 258434 | 5/1970 | U.S.S.R. | 361/127 |

*Primary Examiner*—Patrick R. Salce
*Attorney, Agent, or Firm*—Rodgers & Rodgers

[57] ABSTRACT

A surge arrester of compact construction includes a housing formed preferably of elastomeric material through which a pair of spaced terminals protrude and between which a stack of metal oxide varistor discs is disposed and connected in series therewith. Disposed below the lower one of the discs and in contact therewith is a conductive base plate and an electrode is spaced somewhat from the lower surface of the base plate to form a gap and is provided with shunt means connecting the electrode with the upper surface of the lower disc so that an overvoltage surge condition and the resulting arc across the gap establishes a shunt circuit around the lower disc. Thus the lowermost disc is effectively shunted during surge conditions thereby enhancing the protective response of the device while the lowermost disc is in the circuit during stabilized conditions and effectively increases the overall resistance of the arrester and by this means limits the magnitude of current and prevents undesirable overheating and the attendant run away tendency of the arrester. Since the elastomeric housing is in direct heat transferring contact with the stack of varistors, heat transfer to atmosphere is greatly facilitated.

9 Claims, 3 Drawing Figures

SURGE ARRESTER HAVING COAXIAL SHUNT GAP

TECHNICAL FIELD

This invention relates to surge arresters formed of metal oxide varistor discs disposed within a compact housing and arranged to prevent overheating during normal service conditions and by special coaxially arranged gap means connected in shunt with a portion of the varistor stack enhances the protective response of the device during surge conditions.

BACKGROUND ART

Conventional surge arresters include silicone carbide valve elements arranged in series with gaps such as that disclosed in U.S. Pat. No. 3,727,108—Surge Arrester, issued Apr. 10, 1973 and assigned to the assignee of this invention.

U.S. Pat. No. 4,100,588 discloses an arrangement in which varistors of the zinc oxide type, for example, are disposed inside a porcelain housing specially constructed to dissipate heat.

DISCLOSURE OF INVENTION

According to this invention in one form, heat dissipation is faciliatated by mounting a stack of varistor discs inside an elastomeric housing which is in direct heat transferring contact with the peripheries of the varistor discs. Generation of heat is minimized by utilizing one or more supplementary varistor discs which effectively increase the overall resistance of the arrester so that during normal conditions the leakage current drawn through the varistor discs is sufficiently small and the dissipation of heat through the elastomeric housing is sufficiently great that thermal failure of the device is prevented. This additional supplementary varistor unit according to a feature of the invention does not impair the protective response of the device during surge conditions because an electrode is arranged in spaced relation to one surface of the added varistor so as to form a gap across which an electric arc is established during surge conditions and the electrode is interconnected with the opposite surface of the added supplementary varistor by shunt circuit means so that this added resistor is effectively eliminated from the circuit during surge conditions without increasing the transverse dimension of the arrester because the gap is disposed in aligned coaxial relationship with the stack of varistors according to a feature of the invention.

BEST MODE OF CARRYING OUT THE INVENTION

Figure 1:
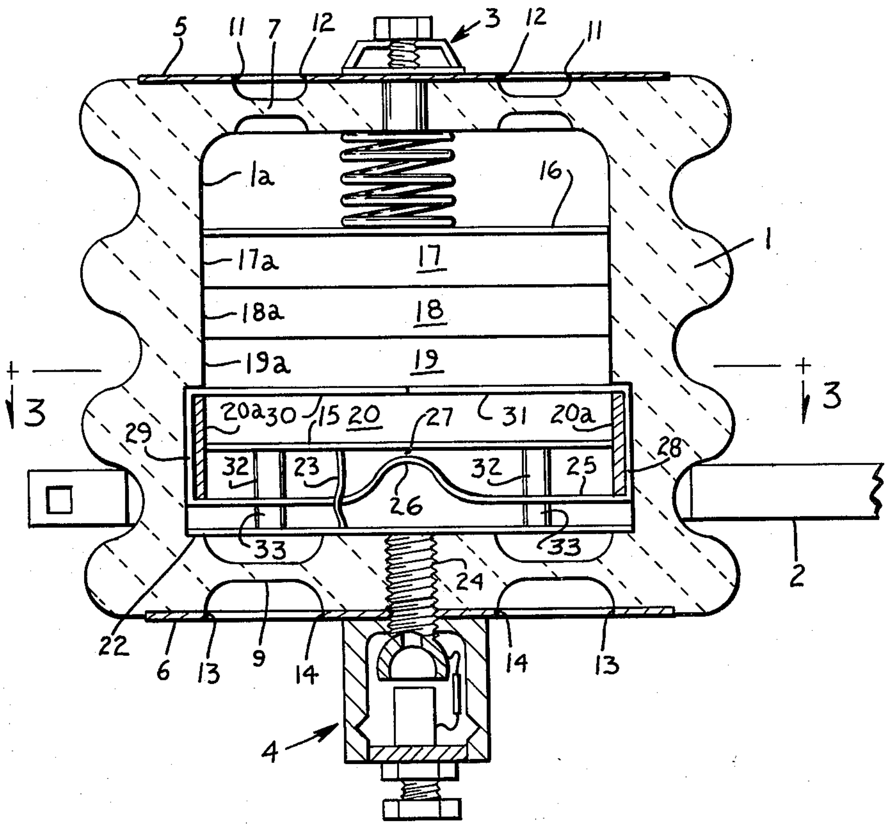
FIG. 1 is a cross-sectional view of a surge arrester constructed according to the invention.
Figure 3:
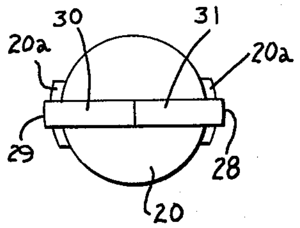
FIG. 2 is an isometric view of an electrode and its associated shunt circuit means constructed according to a feature of the invention and FIG. 3 is a partial cross sectional view taken along the line designated 3—3 in FIG. 1.
Figure 2:
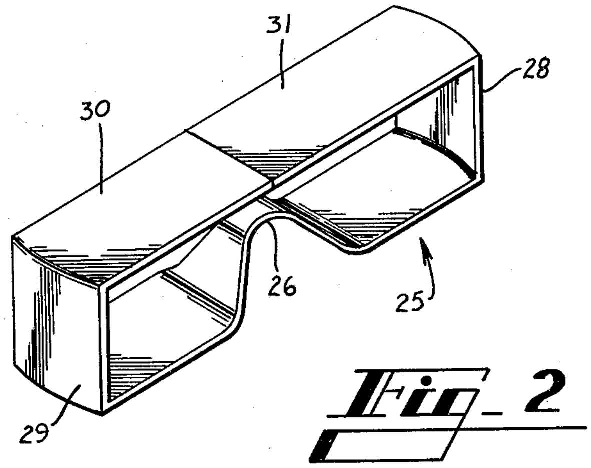

In the drawings, the numeral 1 generally designates a housing constructed preferably of elastomeric material. The numeral 2 designates a support bracket which envelopes the housing 1 and serves as a support means therefore. The line terminal is designated generally by the numeral 3 and the ground terminal is designated generally by the numeral 4. Terminals 3 and 4 are of conventional construction. External terminal plate 5 is associated with line terminal 3 while external terminal plate 6 is associated with ground terminal 4.

For the purpose of relieving internal pressures which may be developed inside elastomeric housing 1, weakened sections 7 and 9 are provided in housing 1. In addition weakened severance lines 11 and 12 are formed in external terminal plate 5 and similar weakened severance lines 13 and 14 are formed in external terminal plate 6. Thus an excessive pressure developed inside housing 1 is relieved by rupturing one or both of the weakened structures 7 and 9 and the grommet-like structure defined by weakened severance lines 11 and 12 and similar grommet-like structure defined by weakened severance lines 13 and 14.

Disposed within the housing 1 and interposed between conductive base plate 15 and conductive top plate 16 is a stack of varistor units 17, 18, 19, and 20. Top conductive plate 16 is interconnected with terminal 3 by a conducting helix 21 and conductive base plate 15 is interconnected with conductive end plate 22 by means of conductor 23. As is apparent from FIG. 1, conductive end plate 22 is directly connected with conducting stud 24 which constitutes a conductive portion of terminal 4.

It is apparent that the peripheral portion such as 17*a* of varistor 17, for example, is in direct heat conducting contact with the inner surface 1*a* of the housing 1 so that any heat generated under normal conditions by leakage current flowing through varistors 17, 18, 19, and 20 is readily dissipated through the wall of housing 1. By this means provision is made for inhibiting the development of dangerously high temperatures in the varistor elements 17–20.

Ordinarily varistor elements 17, 18, and 19 are chosen to provide appropriate protective response during overvoltage surge conditions. The leakage current allowed to flow under normal conditions through varistors 17, 18, and 19 and in the absence of varistor 20 conceivably could be sufficiently great as to increase the temperature of those units to a dangerous level.

Resistance of the varistors 17–19 can be increased to a safe value by the addition of supplementary varistor 20. Unfortunately the addition of resistor 20 inhibits the protective response of the device under overvoltage surge conditions.

Thus according to a feature of this invention, provision is made for shunting the varistor 20 during surge conditions while taking advantage of its resistance during normal conditions and such provision is made according to a feature of this invention by utilizing a minimum of space and without increasing the effective transverse dimension of the housing unit 1.

Thus the electrode 25 having a dome contact 26 arranged in spaced relation to the conductive base plate 15 defines a gap 27. Electrode 25 is connected by shunt plates 28 and 29 with conductive cross plates 30 and 31 which are interposed between the upper surface of varistor 20 and the lower surface of varistor 19 and thus form an effective contact between these two resistors.

For the purpose of properly positioning and electrically insulating electrode 25 from conductive base plate 15, a plurality of cylindrical porcelain insulators 32 are provided and are interposed between conductive base plate 15 and electrode 25 as is apparent from FIG. 1. In addition insulating cylinder 20a is disposed about varistor 20 and insulates the periphery thereof from the shunt structures 28 and 29.

For the purpose of insulating and spacing the electrode 25 from the conductive end plate 22, a plurality of cylindrical porcelain insulators 33 are provided and are disposed as shown in FIG. 1.

With the structure as shown in FIG. 1 operating under normal service conditions, leakage current flows from line terminal 3 through conductor 21, top conductive plate 16, varistors 17, 18, 19, 20, and conductor 23, conductive end plate 22, conductive stud 24 to terminal 4 and thence to ground through a ground conductor not shown. During these conditions, the total resistance of varistors 17-20 is sufficiently great so as effectively to limit the magnitude of leakage current and thus aids in preventing deleterious heating. In addition the fact that the inner surface 1a of housing 1 is in direct contact with the peripheries 17a, 18a, and 19a of the varistors 17, 18 and 19 and with the periphery of varistor 20 through insulating ring 20a causes ready dissipation of heat to atmosphere and thus maintains the unit in a safe temperature range.

During overvoltage surge conditions, the voltage developed across gap 27 is sufficiently high as to establish an arc across that gap which effectively establishes a shunt circuit about varistor 20 and by this means effectively eliminates varistor 20 from the circuit so that varistors 17, 18, and 19 provide effective protective response during such overvoltage surge conditions. Following conduction of the surge current, the gap 27 interrupts the current and thus restores the resistance of varistor 20 to the circuit and effectively reduces the leakage current.

It is apparent from FIG. 1 that by the invention the transverse dimension of the unit is limited due to the coaxial disposition of the gap 27 and by this means the overall size and cost of the unit is minimized.

INDUSTRIAL APPLICABILITY

By this invention, a surge arrester is provided which is compact in physical size and which is thus economical to construct and which is well adapted for reliable performance during normal service conditions due to the inhibited generation of heat and to the effective dissipation thereof. Furthermore effective response of the unit is preserved at minimum cost.

I claim:

1. An electric surge arrester comprising a housing, a plurality of stacked varistor blocks in said housing, a pair of terminals extending through apertures formed in said housing and respectively connected to the end ones of said stacked varistor blocks, an electrode disposed in spaced coaxial alignment with said stacked blocks and interposed between one of said terminals and the adjacent one of said varistor blocks to establish a gap between said electrode and the adjacent part of said adjacent one of said varistor blocks, and shunt means interconnected with said electrode and with a part of said adjacent block remote from said electrode so as to provide a by-pass shunt circuit around said adjacent varistor block in coordination with the development of an overvoltage surge condition and the establishment of an arc across said gap.

2. An arrester according to claim 1 wherein each of said varistor blocks other than said adjacent one of said blocks is arranged with its outer periphery in heat exchanging contact with said housing.

3. An arrester according to claim 1 wherein a conductive base plate is interposed between said electrode and said adjacent one of said varistor blocks and is in conductive contact with said adjacent one of said varistor blocks.

4. An arrester according to claim 3 wherein said conductive base plate is electrically connected with the adjacent one of said terminals.

5. An arrester according to claim 1 wherein an external terminal plate is mounted on said housing at each of said terminals.

6. An arrester according to claim 5 wherein said external terminal plates are formed with weakened severance parts for relieving internal pressure within the arrester housing which is in excess of a predetermined pressure.

7. An arrester according to claim 3 wherein a plurality of insulators are interposed between said electrode and said conductive base plate for securing said electrode and said conductive base plate in spaced insulated relation.

8. An arrester according to claim 1 wherein a conductive end plate is connected with the adjacent one of said terminals and wherein a plurality of insulators are interposed between said conductive end plate and said electrode for securing said conductive end plate and said electrode in spaced insulated relation.

9. An arrester according to claim 8 wherein said conductive end plate is electrically connected with said conductive base plate.

* * * * *